United States Patent
Kelly et al.

(10) Patent No.: US 8,223,063 B2
(45) Date of Patent: Jul. 17, 2012

(54) SYSTEM AND METHOD FOR PRESENTING WIND SPEED INFORMATION IN A PLANAR REPRESENTATION

(76) Inventors: Terence F. Kelly, Madison, WI (US);
Victor W. Marsh, Fitchburg, WI (US);
John S. Moore, Middleton, WI (US);
William H. Boss, Madison, WI (US)

(*) Notice: Subject to any disclaimer, the term of this patent is extended or adjusted under 35 U.S.C. 154(b) by 267 days.

(21) Appl. No.: 12/767,467

(22) Filed: Apr. 26, 2010

(65) Prior Publication Data

US 2010/0265125 A1      Oct. 21, 2010

Related U.S. Application Data

(63) Continuation-in-part of application No. 12/363,141, filed on Jan. 30, 2009, now Pat. No. 7,705,769.

(51) Int. Cl.
*G01S 13/95* (2006.01)
*G01S 7/22* (2006.01)

(52) U.S. Cl. .................. 342/26 R; 342/26 B; 342/26 D; 342/179; 342/182; 342/183

(58) Field of Classification Search ............... 342/26 R, 342/26 A–26 D, 179–183; 340/905, 963, 340/980
See application file for complete search history.

(56) References Cited

U.S. PATENT DOCUMENTS

| | | | |
|---|---|---|---|
| 7,705,769 B2 * | 4/2010 | Kelly et al. | 342/26 R |
| 7,869,953 B1 * | 1/2011 | Kelly et al. | 702/4 |
| 2010/0265125 A1 * | 10/2010 | Kelly et al. | 342/179 |

* cited by examiner

*Primary Examiner* — John B Sotomayor
(74) *Attorney, Agent, or Firm* — Boyle Fredrickson, S.C.

(57) ABSTRACT

A system and method for presenting wind speed information in a manner so as to be easily understood and appreciated by viewers of televised weather report presentations and the like. Wind speed information is presented as a planar representation of three-dimensional wind speed data using contour lines, delineating areas with a planar location in the three dimensional data, overlaid on a geographic map display either alone, or in combination with radar reflectivity information. Wind velocity information received from a weather radar system, such as NEXRAD, relative to the weather radar is converted to absolute wind speed information for display.

20 Claims, 11 Drawing Sheets

SYSTEM AND METHOD FOR PRESENTING WIND SPEED INFORMATION IN A PLANAR REPRESENTATION

CROSS-REFERENCE TO RELATED APPLICATIONS

This application is a continuation in part of and claims priority to U.S. patent application Ser. No. 12/363,141, filed Jan. 30, 2009 now U.S. Pat. No. 7,705,769, which claims priority to U.S. application Ser. No. 11/506,149, filed Aug. 17, 2006, which claims priority on U.S. Provisional Application No. 60/708,873, filed Aug. 17, 2005, the entireties of which are herein incorporated by reference.

FIELD OF THE INVENTION

The present invention pertains generally to systems and methods for displaying representations of weather phenomena, e.g., overlaid on maps of geographic locations, for televised weather presentations, and the like, and computer-based systems and methods for preparing and manipulating such presentations including systems and methods for processing and displaying wind speed information.

BACKGROUND OF THE INVENTION

Various systems and methods have been developed for providing viewers of broadcast and cable television weather presentations with informative and accurate weather information. Typically, such systems provide a display of representations of weather phenomena, e.g., clouds, rain, storms, etc., overlaid on a map of a geographic area of interest. Such displays were originally created by drawing representations of weather phenomena, or placing pre-made weather phenomena symbols, on a physical map of an area of interest. The image of the map was then broadcast with a weather presenter positioned in front of the map to provide an explanation of the map display. Computer systems are now employed to facilitate the generation of such weather presentations, using computer-generated graphics and animation.

A typical computer-implemented system for preparing a weather report presentation will include detailed digital maps of geographic areas of interest stored for access by the computer. Weather information, such as satellite imagery and/or weather radar information, such as NEXRAD weather radar information provided by the government or live local radar data, is provided to the system. The system processes the received weather information that is then overlaid in graphical form on the digital maps to create a graphic display of the weather for a particular area of interest. The weather information received by the system may be processed to generate weather symbols, color contours, or other representations of the weather information that are overlaid on the digital maps to create the weather presentation. A series of such weather displays may be generated by the computer system, and played back in sequence to provide an animated image of the movement of weather phenomena through a geographic area. Such systems may provide an operator with various tools for selecting, e.g., the geographic location to be displayed, reference points to be displayed on the geographic map, e.g., cities, roads, borders, etc., the source of weather information to be displayed on the geographic map, e.g., satellite imagery or radar, and how the weather information will be presented, e.g., symbols, color contours, etc. An exemplary system and method for the preparation of graphical weather displays for broadcast as part of a weather report presentation, particularly for the preparation of weather displays that show the current and predicted path of severe weather, is described in U.S. Pat. No. 6,339,747, which is assigned to Weather Central, Inc., the assignee of the present application, the details of which are incorporated herein by reference.

Although a variety of different types of weather information are used to generated weather displays to be used as part of broadcast and other weather report presentations, not all of the currently available types of weather information typically are automatically processed for inclusion in such presentations. Some types of weather information are provided currently from their respective weather information sources in a form that is useful only to a trained meteorologist or other professional who can interpret the information as provided and then manually or orally incorporate the information into a broadcast weather report presentation. In other cases available weather information may be presented to viewers of a weather report presentation in a manner such that it is difficult for the typical viewer to understand the significance of the information or how the information relates to a particular interested viewer. An example of weather information that is currently available but not currently presented as a part of weather presentations in a form that is useful to most viewers, if at all, is wind speed information.

Modern weather radar systems, such as the government's NEXRAD weather radar system, are able to provide wind velocity data in a graphical form. In the current commonly used presentation format, wind velocity information is presented based on the Doppler shift information that the radar system uses to determine wind velocity. That is, wind velocity information may typically be displayed by current systems as a graphical overlay on a geographic map display showing one color in areas with wind headed toward the radar site and another color in areas with wind headed away from the radar site. Wind intensity relative to the radar site is shown in the intensity or shading of the color in which the wind velocity is presented in the map display. From such a graphical presentation a trained professional can locate high wind areas, determine wind directions, observe rotational activity (e.g., tornadoes), and report on these to viewers of a weather report presentation. However, such a display of wind velocity (speed and direction) relative to a radar site in and of itself is difficult to comprehend for an average weather report viewer who simply wants to know how fast or strong the wind is blowing.

What is desired, therefore, is an improved system and method for presenting weather phenomenon information, specifically wind speed information, in a manner that is more easily understandable to viewers of televised and other weather report presentations. Such a presentation of wind speed information should be easy to interpret by individual viewers in a manner such that a viewer can immediately understand the significance of the weather information being presented to the individual viewer's specific location of interest. Such wind speed information preferably also may be presented to a user electronically in a personalized manner, e.g., via email, cellular phone, etc., such that the user is made aware of nearby wind speed alerts and/or the wind speed at the user's current location or other location of interest (home, work, school, vacation home, etc.).

SUMMARY OF THE INVENTION

The present invention provides a system and method for presenting wind speed information in an improved manner, such that weather report presentation viewers are better able to understand and appreciate the significance of the weather information being provided to them. The present invention may be implemented in a computer system that automatically receives wind velocity or other wind data in a three dimensional volume format from appropriate data sources and processes the received data to generate easily understandable displays of such information that may be incorporated in a televised broadcast weather report presentation or a weather presentation provided on the internet or via any other communications media.

In accordance with the present invention, wind speed information is presented to viewers as wind speed contours in a vertical or nearly vertical slice taken from the three dimensional volume, with different colors or shading of the contours representing different absolute wind speed, overlaid on a geographic map display. The wind speed contours delineate geographic and vertical areas experiencing different ranges of wind intensities, such that a viewer can easily determine the wind intensity in areas of interest to the viewer. The wind speed contours may be labeled to indicate wind speed intensity and/or colored or shaded to indicate wind speed intensity with an appropriate legend provided on the display to allow a viewer to interpret the coloring or shading of the contours provided. The wind speed contour slice may be displayed on a map display along with radar reflectivity data, showing precipitation intensity, such that a viewer can determine storm intensity, i.e., wind speed in combination with precipitation intensity, for the viewer's location of interest.

Although wind speed contouring is described herein as being displayed, the slice may be configured to display other variable data received as a three dimensional volume. Exemplary additional data type may include reflectivity, [. . . ]

A wind speed presentation in accordance with the present invention may be derived automatically by a computer system that receives wind velocity data (as well as reflectivity data) or other wind data from a weather radar system, such as the NEXRAD radar system used to create a three dimensional weather data volume. If wind velocity data is received from such radar systems as wind velocity relative to the radar site, in accordance with the present invention, absolute value wind speeds are determined from the radar site relative wind velocity data received from the radar system. This absolute value wind speed data is used to generate the wind speed contours that are displayed in an angled view overlaid on, e.g., computer generated geographic maps (either alone or along with the radar reflectivity data), to provide a more easily understandable representation of wind speed information that may be incorporated in a televised or other weather report presentation.

In accordance with the present invention, wind speed information also or alternatively may be provided directly in a personalized manner to individual viewer users. For example, such user viewers may be individuals or businesses that provide to a computer system providing wind speed information in accordance with the present invention an indication of a specific location of interest. Such a location may include the viewer's home, place of work or business, or the like. As wind speed information is received by the system it is compared to stored viewer locations of interest. As alert level wind speeds are determined to occur within a certain range of a viewer location of interest a wind speed alert or other message may be generated and delivered to a contact address provided by the viewer. For example, the contact address may be an e-mail address, cellular or other phone number, or the like. The wind speed alert message generated and delivered may thus be an e-mail or cellular phone text message providing the distance of the wind speed alert from the viewer location of interest, may include a graphical display indicating the nature of the wind speed alert relative to the viewer's location of interest, and/or may even include a voice message generated, e.g., by a voice message generator in the computer system.

Further objects, features, and advantages of the present invention will be apparent from the following detailed description taken in conjunction with the accompanying drawings.

DETAILED DESCRIPTION OF THE INVENTION

The present invention provides a system and method for presenting weather phenomenon information, specifically wind speed information, in a manner that is useful and informative to viewers of such information who are not meteorologists or weather experts. The present invention will be described in detail herein with reference to the generation of wind speed presentations that may be incorporated as part of broadcast or other televised weather report presentations. It should be understood, however, that the present invention also is applicable to the generation of wind speed information presentations that may be provided to viewers over various other communications media other than broadcast (including over-the-air, cable, satellite, etc.) channels, including weather report presentations delivered to viewers over the internet and via other wired or wireless communications systems, such as cellular phones and the like.

Figure 1:
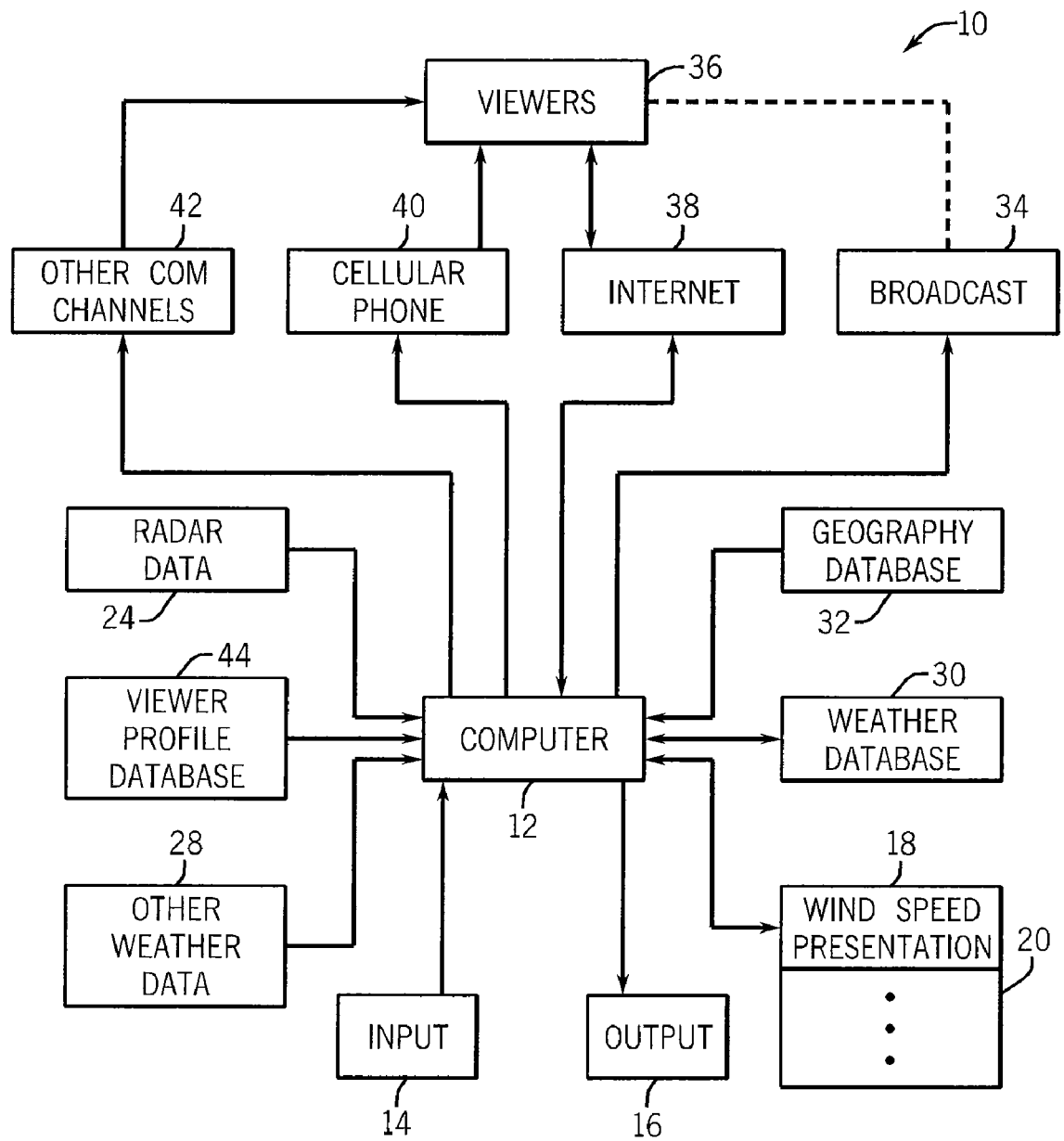
FIG. 1 is a schematic block diagram of an exemplary computer based system for implementing a system and method for generating wind speed information presentations in accordance with the present invention.

Wind speed information presentations in accordance with the present invention preferably are generated substantially automatically, i.e., with minimum user interaction required, in a computer based weather presentation generating system. An exemplary computer based system 10 for generating wind speed information presentations in accordance with the present invention is illustrated in FIG. 1. Any conventional computer system 12 may be used to implement the functions required for generating viewer friendly wind speed information presentations in accordance with the present invention. Preferably, a computer 12 having sufficient processing power and speed to process significant amounts of graphical and other information in a reasonable amount of time is employed. The computer 12 used for generating wind speed information presentations in accordance with the present invention may be implemented as a single computer or as several computers networked together in a conventional manner. Computers 12 already in use by producers of weather report presentations to generate such reports may be programmed with the additional functionality required to implement a method for presenting wind speed information in accordance with the present invention. The computer 12 employed to implement the present invention preferably includes conventional input devices 14, e.g., a computer keyboard, mouse, etc., to allow an operator to interact with the program functionality, as well as conventional output devices 16, e.g., one or more high resolution computer displays for reviewing the wind speed presentations generated by the system 10. Conventional computer memory 18 associated with the computer 12 is used to store the programs which implement the functions of generating wind speed presentations 20 in accordance with the present invention in the manner to be described in more detail herein. The computer memory 18 also includes the required operating system and other programs for general operation of the computer 12 on which the system and method for presenting wind speed information in accordance with the present invention is implemented. Based on the detailed description, exemplary presentation output, and flow chart diagrams described herein, a person of ordinary skill in the art of computer programming for the generation of weather report presentations win be able to implement a system and method for presenting speed information in accordance with the present invention on a conventional computer system 12 as described herein using conventional operating systems and programming languages as commonly used for such applications.

A system 10 for generating wind speed presentations in accordance with the present invention preferably generates presentations substantially automatically based on weather phenomenon data that is provided to the system 10 from one or more weather information sources. For example, weather radar data 24 provided to the system 10 may include wind velocity or wind speed data as well as radar reflectivity data that is used in generating automatically a wind speed presentation 20 in accordance with the present invention, as will be described in more detail below. An exemplary weather radar source of such wind velocity data is the NEXRAD weather radar system operated by the National Weather Service. The wind velocity data provided by NEXRAD, and other, weather radar systems, typically is provided relative to the weather radar site, i.e., identifying wind headed toward or away from the radar site and the relative velocity thereof. As will be discussed in more detail below, such radar site relative wind velocity data is converted into absolute value wind speed information for incorporation in a viewer friendly wind speed presentation 20 in accordance with the present invention. It should be understood that the present invention may also make use of other wind data provided by other radar 24 or other weather information sources, including such sources that may provide absolute value wind speed information, for generating wind speed presentations in accordance with the present invention.

According to an exemplary embodiment, the received data may be a three dimensional data set or a data volume. The data volume may be generated by combining the results of multiple radar scans, wherein each radar scan is taken at a different tilt of the radar beam. Accordingly, the received data from each tilt will include data at a different altitude in a cone extending outward from the radar site.

Although the radar data described herein with reference to wind data, it is important to recognize that the present invention may be applied to any three dimensional radar volume. For example, a radar volume may include data from a dual-pole radar system. In dual-pole radar, transmit radar wave pulses in both the horizontal and vertical direction at the same time. Dual pole data allows measurement of precipitation particles, such as hail and/or rain, in two different directions, providing more detailed weather information.

Further, the radar data volume may include radar scan data from multiple radar sites. Where multiple sites are used, the received data may be converted from relative data (i.e., wind speed towards and/or away from the radar site) to absolute data (i.e., general wind speed). The data may be converted based on additional information such as the relative location of each radar site, the tilt of the radar scan for each location, etc.

The system 10 may also receive other weather data 28 from other weather data sources. Such other weather data 28 may include weather information received from remote or manned weather observation positions, satellite imagery, etc. Such other weather data 28, in combination with wind and radar reflectivity data, may be employed by the system 10 to generate a complete weather report presentation, including a wind speed presentation in accordance with the present invention. Selected weather information from the weather information sources 24 and 28 may be stored for processing in a weather database 30 by the system computer 12.

The system 10 also preferably employs geographic data, including geographic maps and other information, to generate wind speed presentations in accordance with the present invention. Such geographic data may be stored in one or more geography databases 32. The geography database 32 may thus include information such as, for example, computer generated maps and/or satellite imagery of geographic areas of interest, as well as geographic information or programs for converting generic geographic coordinates, e.g., latitude and longitude coordinates, to specific address locations, including landmark locations, roads and street, etc. Commercially available geographic map data, satellite imagery, and other geographic information may be employed to populate the geographic database 32, as required.

Wind speed presentations generated by the system 10 may be previewed by an operator thereof on the system display screen or other output 16. The resulting wind speed presentations, either alone or in combination with other presentations of current or forecast weather phenomenon or conditions, may then be sent to a broadcast system 34 for broadcast as part of a televised or other weather report presentation. Wind speed presentations in accordance with the present invention also may be recorded for broadcast at a later time, and/or may be delivered to viewers 36 via various different communications media including via cable, satellite, computer network (such as the Internet 38), wireless communications such as cellular phone 40), and other direct communication channels 42, etc.

As will be discussed in more detail below, a system and method for presenting wind speed information in accordance with the present invention may generate wind speed presentations for broadcast or other distribution to viewers 36 within a particular area of interest as well as, or alternatively, personalized wind speed presentations that may be delivered to individual or business viewers 36. Such individual viewers 36 may communicate with the system 10 via conventional wired or wireless communication channels, such as the internet 38, cellular phone 40, or other 42 communication channels, to provide viewer profile information to the system 10. Such viewer profile information may include, for example, one or more viewer locations of interest, such as a home, school, place of business or other operations, etc. The viewer profile information may also include a viewer contact address to which the personalized wind speed information presentation generated by the system 10 is to be delivered. The viewer contact address may be, for example, an e-mail address, cellular or other telephone number, etc. (The viewer profile information may be provided to the system 10 over the internet 38 via an online user interface of the type illustrated and described in U.S. Pat. Nos. 6,498,987 and 6,823,263 entitled SYSTEM AND METHOD FOR PROVIDING PERSONALIZED WEATHER REPORTS AND THE LIKE and U.S. Pat. No. 6,654,689 entitled SYSTEM AND METHOD FOR PROVIDING PERSONALIZED STORM WARNINGS, the details of which are incorporated by reference herein.) Such viewer profile information may be stored in a viewer information database 44 for use by the system 10 in generating and delivering personalized wind speed presentations in accordance with the present invention.

Wind velocity data received from weather radar sources, such as NEXRAD, typically is provided relative to the radar site. Currently, wind velocity information also typically is presented graphically in this relative manner. For example, such wind velocity data may be shown overlaid on a computer generated map background. In this conventional manner of presenting wind velocity data, wind heading toward the radar site is indicated in one color or shade, with wind headed away from the radar site indicated in another color or shade. Wind velocity amplitude is indicated by further shading of the wind velocity data. This type of wind velocity presentation may be very useful to meteorologists and other trained professionals. For example, from such a presentation a meteorologist may notice high wind velocities headed in opposite directions in nearly adjacent areas, indicating the possibility of rotation, e.g., tornadic activity. However, such a conventional presentation of wind velocity data may not be very easily understood or appreciated by the ordinary viewers of broadcast and other weather presentations.

Figure 2:
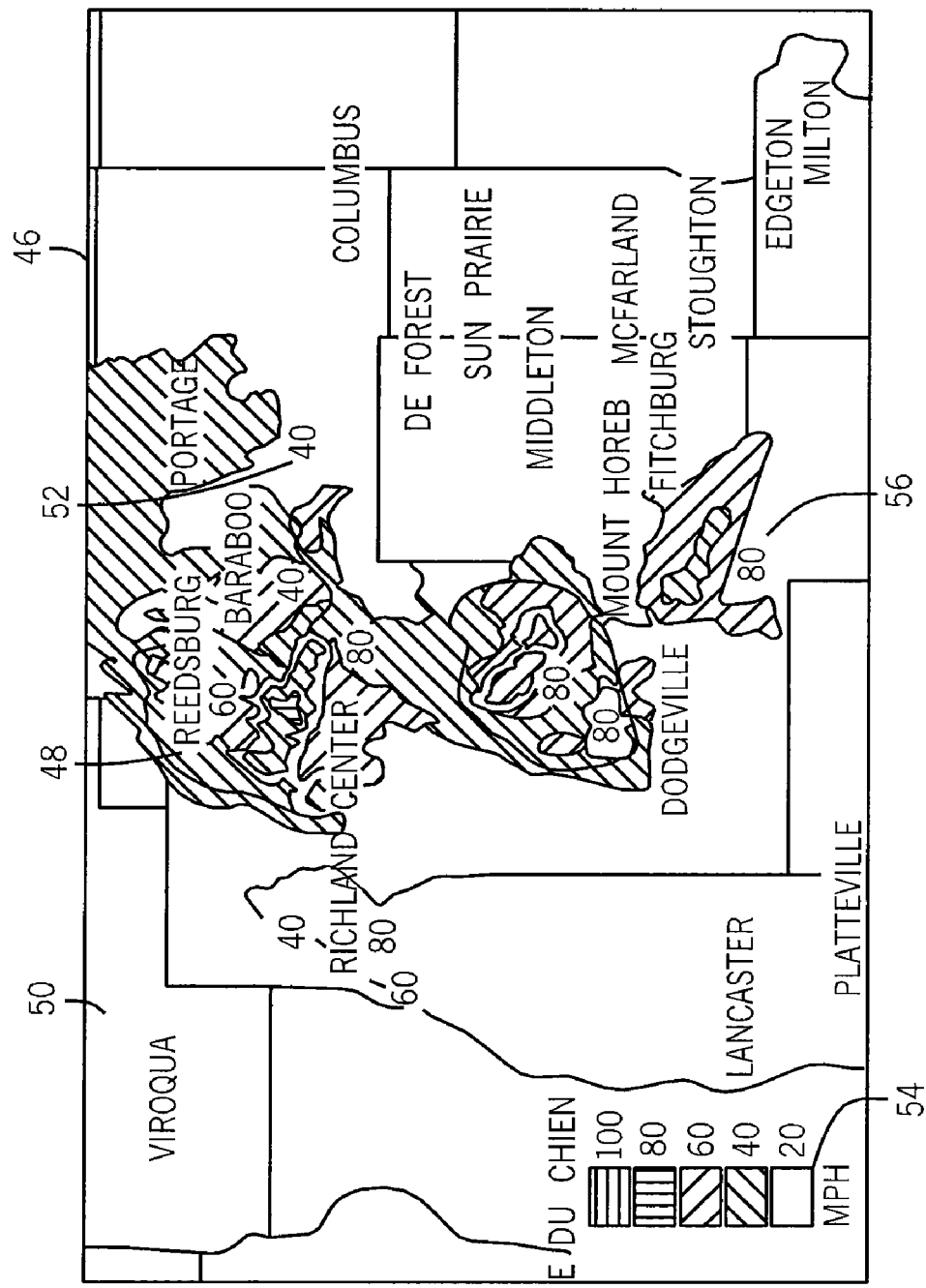
FIG. 2 is an exemplary illustration of wind speed information presented in accordance with the present invention as wind speed contours overlaid on a computer generated map display in combination with a graphical representation of weather radar reflectivity (precipitation intensity) information.

In accordance with the present invention, absolute value wind speed information is presented in a manner that is more easily understandable by viewers of broadcast and other weather report presentations. An exemplary wind speed presentation display 46 in accordance with the present invention is illustrated in FIG. 2. In accordance with the present invention, wind speed information is presented as contour lines 48 overlaid on a geographic map display 50. The contour lines 48 delineate areas of absolute wind speeds. That is, the areas between the contour lines 48 represent areas in which the absolute wind speed (i.e., wind speed relative to the ground) falls within a selected range. Contour lines 48 may be color coded or otherwise labeled numerically 52 (e.g., in miles per hour (MPH) of wind speed) to indicate the absolute wind speeds delineated by the contour lines 48. An appropriate legend 54 may be provided on the presentation to allow a viewer to interpret any color coding or shading provided on the contours 48. In accordance with the present invention, the wind velocity contours 48 may be overlaid on the map display 50 in combination with radar reflectivity data 56, indicating precipitation intensity. Different levels of reflectivity (precipitation) may be designated by different colors on the display 46. By combining absolute wind speed information contours 48 with radar reflectivity 56 (precipitation) intensity information, a viewer of the combined display 46 is able quickly to determine both wind speed and precipitation intensity for the viewer's particular location of interest.

Figure 3:
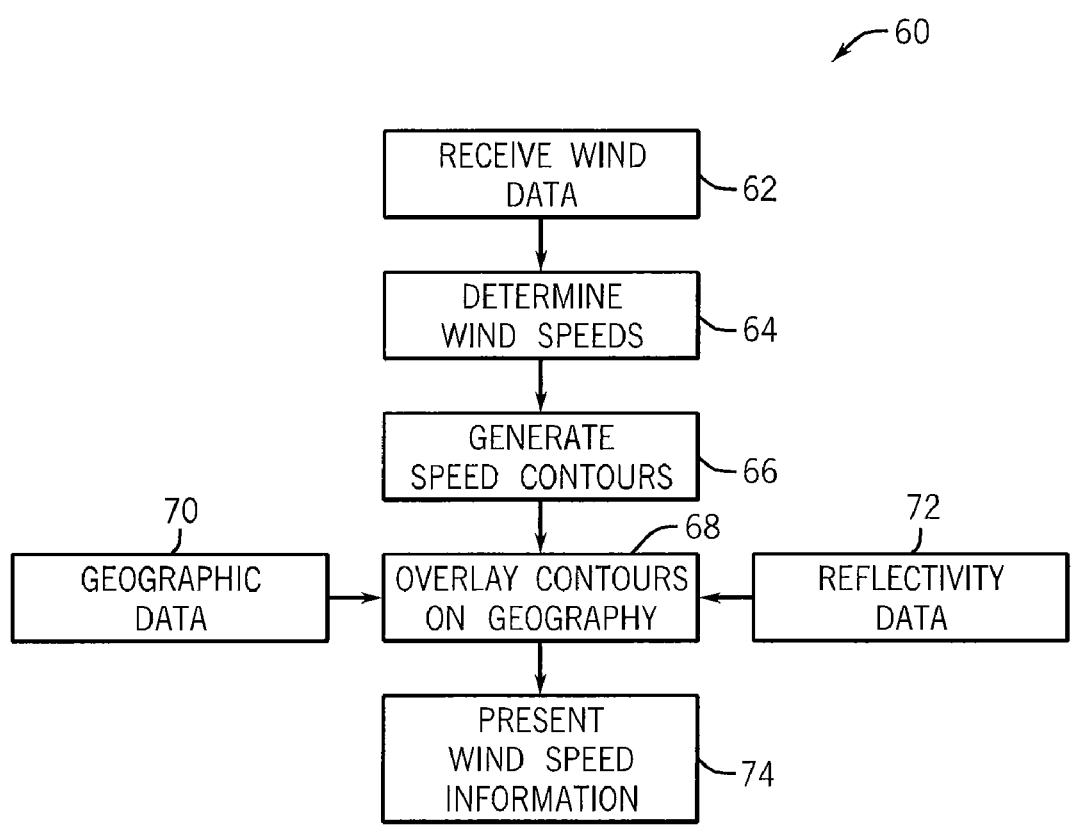
FIG. 3 is a flow chart diagram illustrating an exemplary method for generating a wind speed information presentation in accordance with the present invention.

An exemplary method 60 for generating a wind velocity presentation in accordance with the present invention will now be described with reference to the flow chart diagram of FIG. 3. The process begins with the wind velocity data as received 62 from the data source, such as a weather radar system, e.g., NEXRAD. As discussed above, wind velocity data provided by such systems may include wind velocity amplitude and direction information relative to the radar site at which the wind velocity is determined. In accordance with the present invention, this relative wind velocity data received 62 from the weather radar source is converted 64 into absolute wind speed information. (If the wind information received by the system is already in the form of absolute wind speed this step may be skipped.) The absolute wind speed information is employed, in turn, to generate 66 the wind velocity contours. As described above, wind velocity contours define geographic areas having wind velocities falling between defined ranges. Different colors or labels may be used to indicate the specific wind velocity or range of wind velocities represented by the wind velocity contours 48. The generated wind velocity contours 48 are then overlaid 68 on geographic data 70 to generate a wind velocity display in accordance with the present invention, e.g., as illustrated in FIG. 2. Geographic data 70 over which the wind speed contours are displayed may include conventional available computer generated map imagery or other geographic information. The contours 68 are overlaid on the proper position on the geographic data 70 in a conventional manner. The use of navigated geographic map data facilitates this overlaying process. As discussed above, weather radar reflectivity data 72, showing precipitation intensity, e.g., as various different colors, may also be overlaid on the geographic data 70, with the wind speed contours overlaid on the reflectivity data 72, as illustrated by example in FIG. 3. The resulting wind speed information display may then be presented 74 as desired, e.g., as part of a televised weather report broadcast or other weather presentation.

Although shown by example in FIG. 2 as a two-dimensional presentation, it should be understood that a wind speed presentation in accordance with the present invention may also be provided in three-dimensional form, e.g., with three-dimensional contours showing absolute wind speed at various altitudes. Such a three-dimensional presentation may be viewed in a variety of ways, e.g., by slicing, virtual fly-through, etc.

For example, the wind speed data may be provided in a planar representation of a subset of the data volume in which three-dimensional data may be represented as a plurality of planar views with reference to a point of reference or a defined plane that is either external or internal to the three-dimensional weather radar data set. As will be described in more detail below, an operator may interactively define an planar view as displayed over a graphical representation of a geographical area. Such graphical representations may be implemented, for example, as computer-generated map, satellite or aerial images, etc., that are stored in a geography database provided as part of, or accessible by, the system 10. Although many types of maps and/or images are described, navigable computer-generated map information may be utilized. The geographical information may further include identification of cities or other geographic information found to be in the area affected by the storm being view using the planar view.

Figure 4:
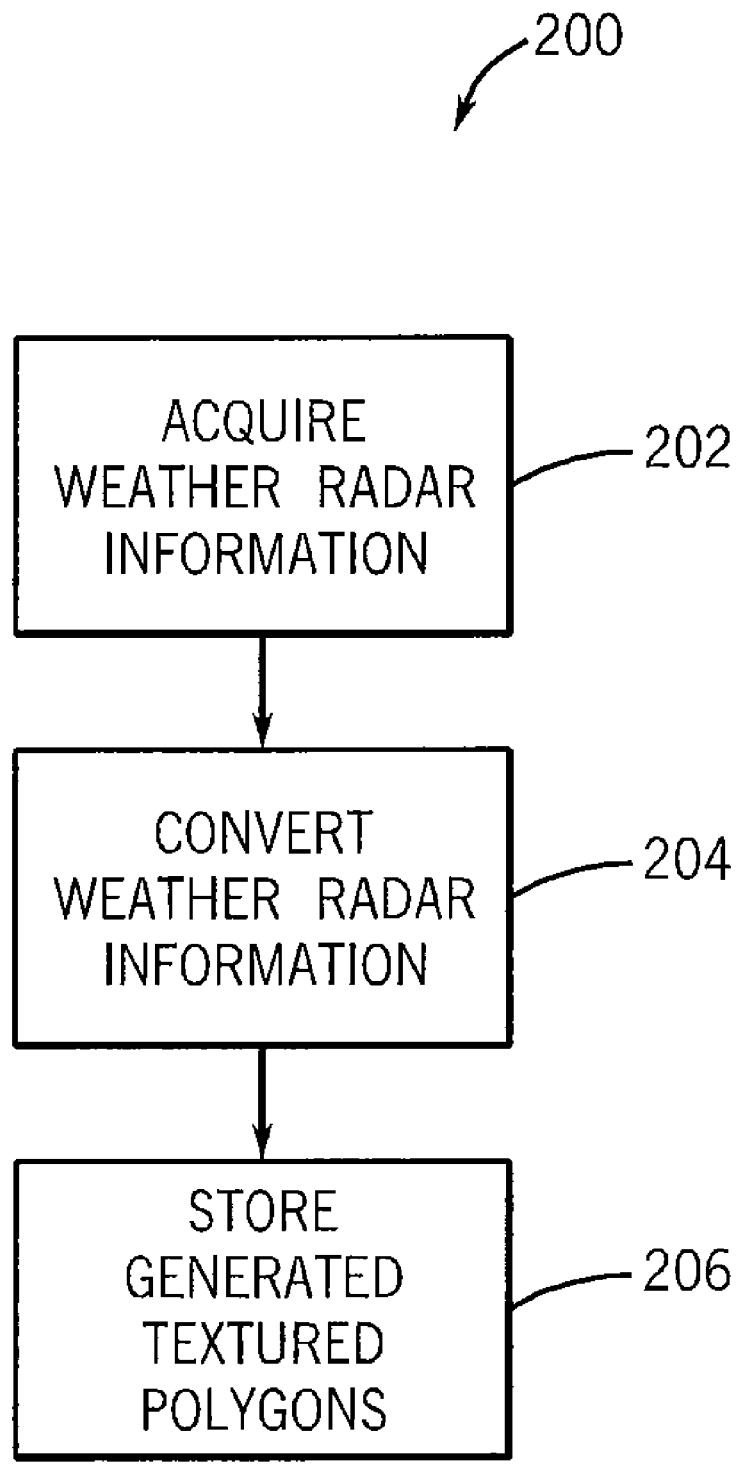
FIG. 4 is a flow chart diagram illustrating a method for receiving and converting three-dimensional grid data into a texture map configured for generating planar view displays in accordance with the present application.

Referring now to FIG. 4, a flowchart 200 illustrating a method for generating planar representations of three-dimensional weather data is shown, according to an exemplary embodiment. Although flowchart 200 shows particular steps in a particular order, it should be understood that the method may include more, fewer, and/or a different configuration of steps to implement the functionality described herein.

In a first step 202, system 10 is configured to acquire radar data from a weather information server, such as weather radar data 24, described above. Generally, the format of the three-dimensional weather data is a three-dimensional grid with latitude, longitude and elevation dimensional, with each grid point containing a dBZ value indicative of reflectivity at that location. The acquired data may be three-dimensional grid weather data stored in a three-dimensional grid. However, other types of weather data and data representations may also be acquired and converted or extrapolated to obtain the desired three-dimensional weather data.

In a step 204, the three-dimensional grid weather data may be converted into an internal representation that is suitable for display. For example, the data may be used to generate an OpenGL 3d texture containing color values with transparency values that correspond to the dBZ values. The data may be drawn using a set of textured polygons that slice the volume of data. Each polygon may be oriented perpendicular to a defined line of sight, described in further detail below, and bounded by the volume of the grid data. The polygons may be drawn farthest to nearest to preserve the transparency present in the texture.

In a step 206, the generated textured polygons may be stored by apparatus 10 and used for the generation on the planar representations. The information may be stored by system 10 in any conventional database to allow retrieval and manipulation of the data stored therein.

Figure 5:
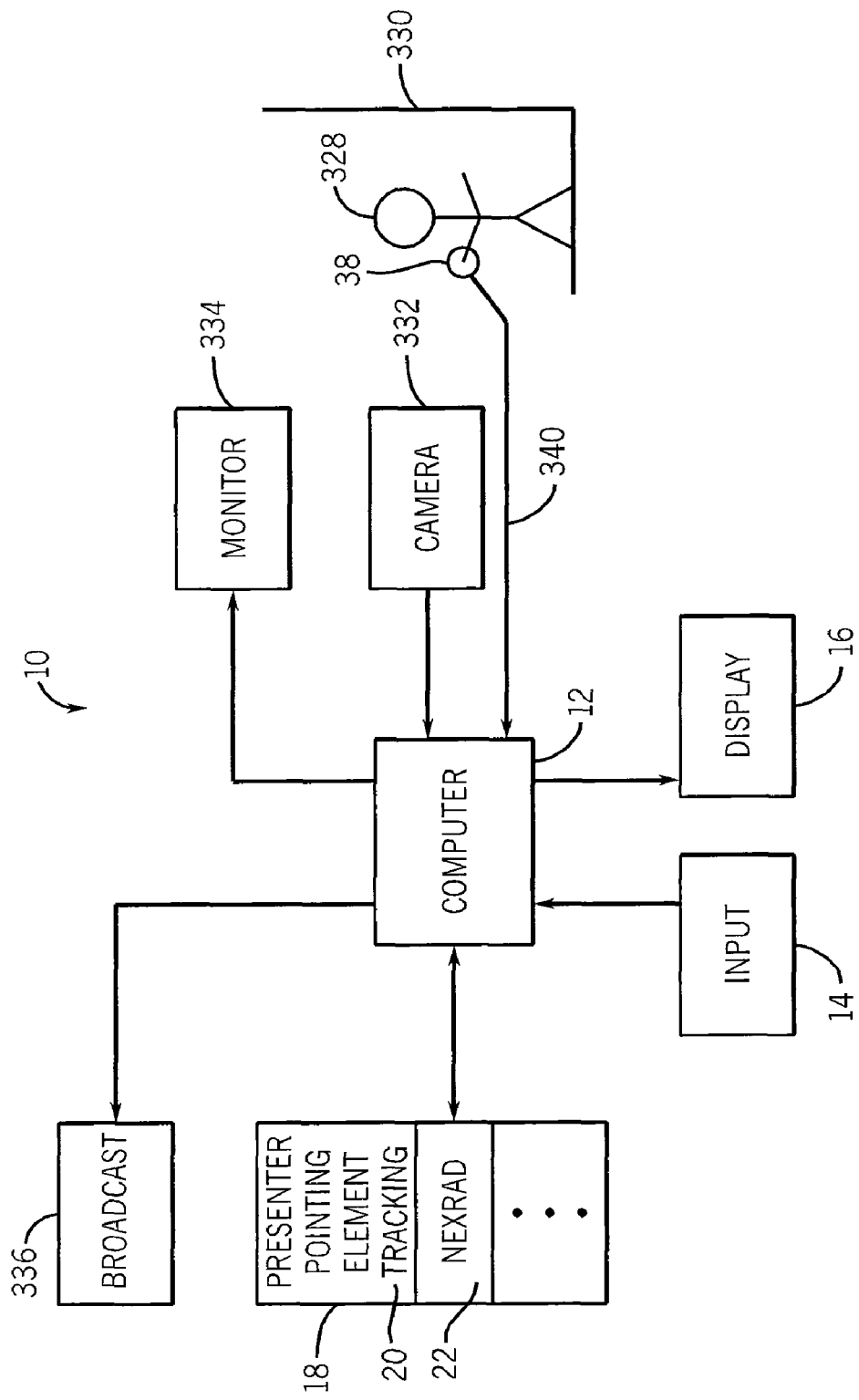
FIG. 5 is a schematic block diagram of an exemplary computer-based apparatus for presenting a weather presentation including a planar view of three-dimensional weather radar data in accordance with the present application.

Referring now to FIG. 5, during the presentation of a presentation using the apparatus and method for presenting planar representations, an on-screen presenter 328 is positioned in front of a screen 330 having a pre-selected background color. A video image of the presenter 328 in front of the background color screen 330 is obtained in a conventional manner using a conventional video camera 332 and is provided, in digital format (e.g., using conventional analog-to-digital video conversion), to the computer system 10. Within the computer system 10, the video image of the presenter 328 in front of the background screen 330 is combined with video scenes by replacing picture elements (pixels) of the video image of the presenter 328 in front of the screen 330 having the background screen color with corresponding pixels of a video scene. The resulting combined video image, therefore, shows the presenter 328 in front of or as part of the scene. This combined image may be provided as feedback to the presenter 328 on a conventional video monitor 334, positioned in the field of view of the presenter 328, so that the presenter 328 may coordinate his or her movements and positions with the scene in which the presenter 328 appears. This combined video image also may be broadcast 336 in a conventional manner, or recorded for broadcast at a later time.

The video image of the on-screen presenter 328 in front of the background color screen 330 also may be analyzed by the computer system 10 using pointing element tracking software 20 to track the position of a pointing element, e.g., the presenter's hand, in the video image field. A communication device 338 also is provided to the presenter 328, whereby the presenter 328 may send a signal to the computer apparatus 10 while the presenter 328 appears onscreen as part of the presentation. The communication device 338 may be implemented, for example, as a hand-held device having one or more buttons. The communication device may also, or alternatively, include a foot pedal or other foot-operated device. The communication device 338 may be coupled via a wired or wireless connection 340 to the computer apparatus 10.

Figure 6:
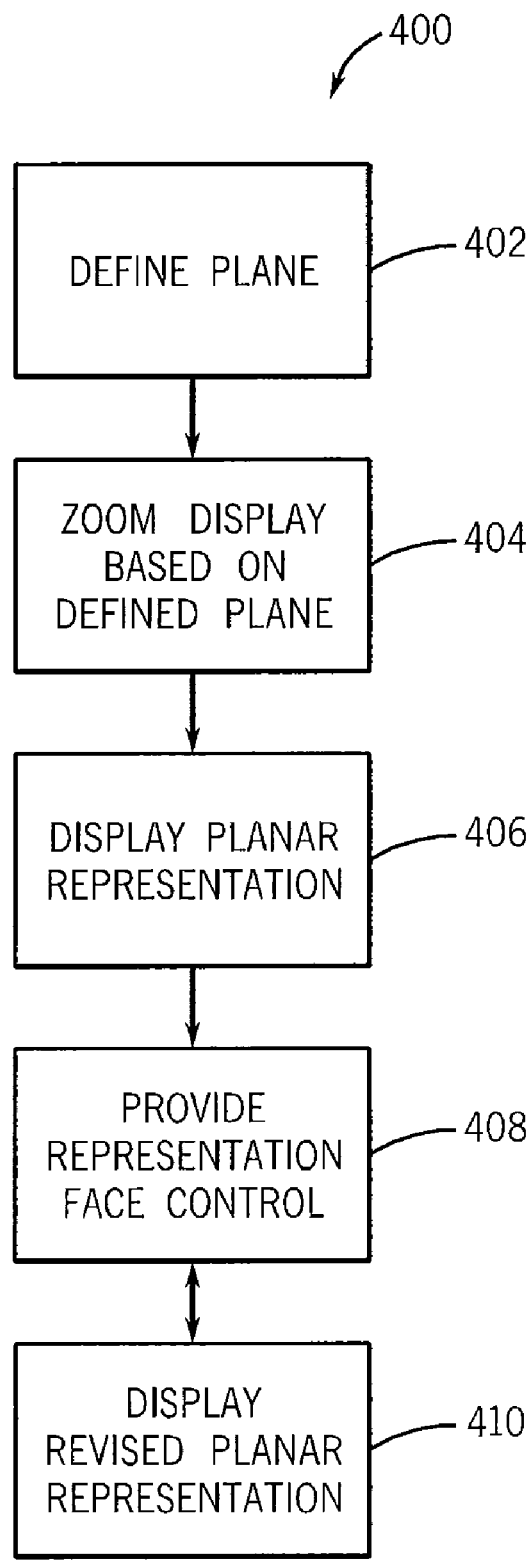
FIG. 6 is a flow chart diagram illustrating a method for displaying and manipulating a planar view of three-dimensional weather radar data in accordance with the present application.

An exemplary method for defining and displaying an planar representation in which an on-screen presenter is able to define the area to be shown by providing an indication in a two-dimensional representation of the weather data will be described in detail with reference to the flow chart diagram 400 of FIG. 6 and the exemplary screen shots shown in FIGS. 7A-7D. The apparatus and method provides the operator with the ability to slice the volume represented by the three-dimensional radar data in order to reveal the internal structure of the radar volume.

Figure 7A:
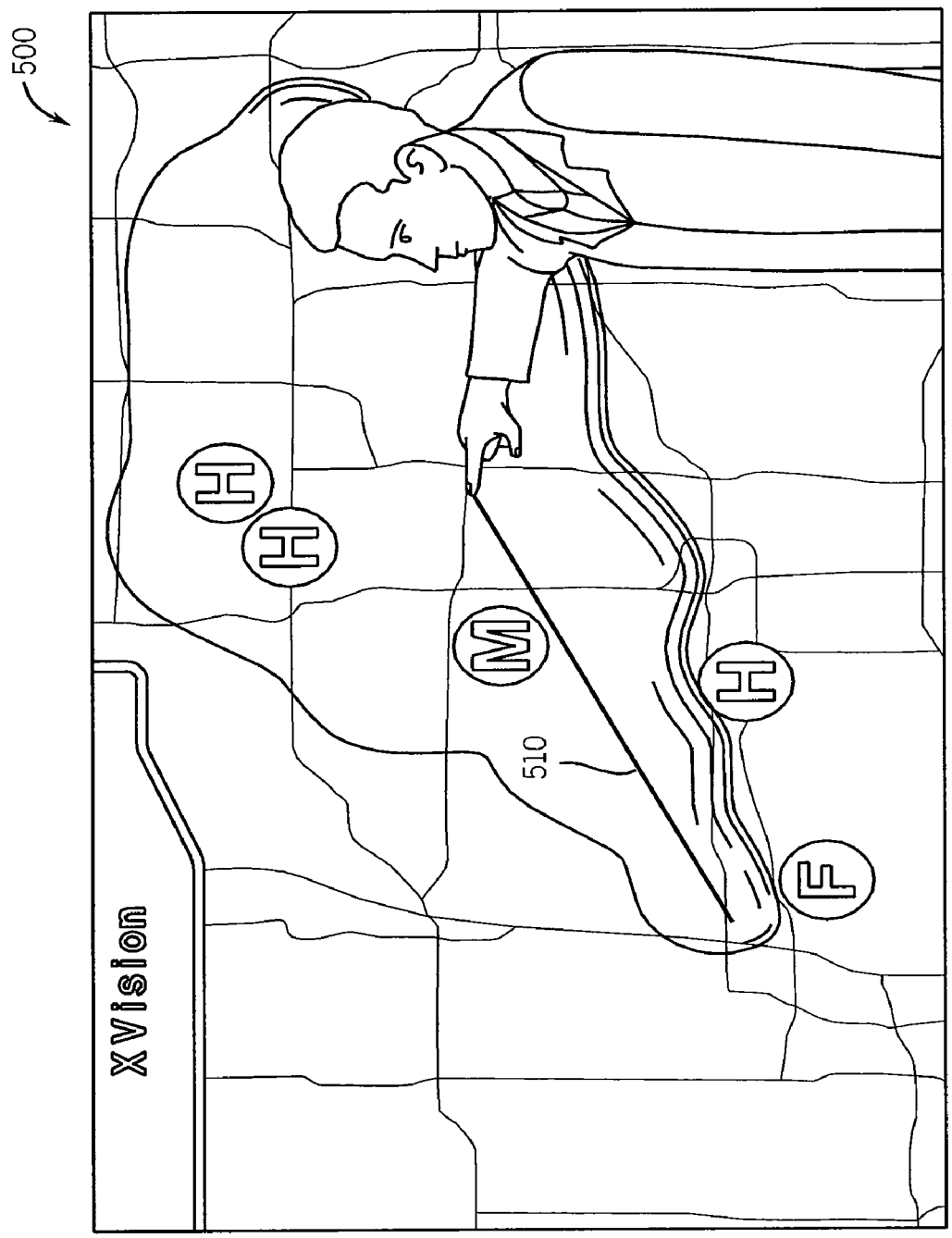
FIGS. 7A-7D are exemplary screen shots illustrating an exemplary graphical user interface and use thereof during a display operation of the three-dimensional radar planar view display method in accordance with the present application.

In a first step 402, the operator first defines a first or initial plane location and orientation. Referring also to FIG. 7A, a first scene 500 may be a computer or otherwise generated digital still or video image of a geographic area over which weather information will be presented as part of a weather report presentation. The weather information may be presented as a two-dimensional representation to allow the operator to easily identify one or more areas of interest within an area of inclement weather. As an initial matter, the on-screen presenter 328 is positioned in front of the background color screen 330 and is provided with the communication device 338 as described earlier. The two-dimensional representation of the weather information is displayed with the on-screen presenter 328 appearing in front of or within the scene by combining the image of the presenter 328 in front of the background color screen 330 as provided by the video camera 332 with the first scene image in the conventional manner described above. This combined image is provided to the on-screen presenter 328 on the monitor 334 so that the presenter 328 can coordinate his or her movements and position in real space with his or her position in the scene using the feedback provided. The movement of a pointing element, e.g., the on-screen presenter's hand, controlled by the on-screen presenter 328, within the video image obtained by the camera 332, is tracked, e.g., using the pointing element tracking software 20 described above. The operator may define a plane location and orientation by selecting a first reference point using an input device, such as the operators hand in combination with the communication device 338, described above. The operator may then similarly select a second point to define a planar line 510 across the two-dimensional representation. Planar line 510 may be located within an area of interest within the two-dimensional representation based on the operators selection. Although described with reference to an operator during a weather presentation, the planar line 510 may alternatively be defined by a computer operator using, for example a mouse. The planar line 510 will define a reference line on the surface of the Earth indicating where a slice will be made through the volume. Definition of the reference line also defines a viewpoint that is a defined distance from the planar line 510 normal to the axis of the planar line 510. The defined distance may be calculated based on the length of the planar line 510 defined by the operator.

Definition of the planar line 510 and/or the view point allows the apparatus 10 to calculate a plurality of planar views that can be displayed. Each of the planar views may be generated based on a defined viewpoint that is defined at a location displaced from the defined plane. The location of the viewpoint may be determined as a function of the size of the plane defined by the operator. For example, where a large plane is defined, the viewpoint may be located further away from the plane such that each of the defined planar views may be seen in their entirety. The viewpoint may be configurable by the operator.

Figure 7B:
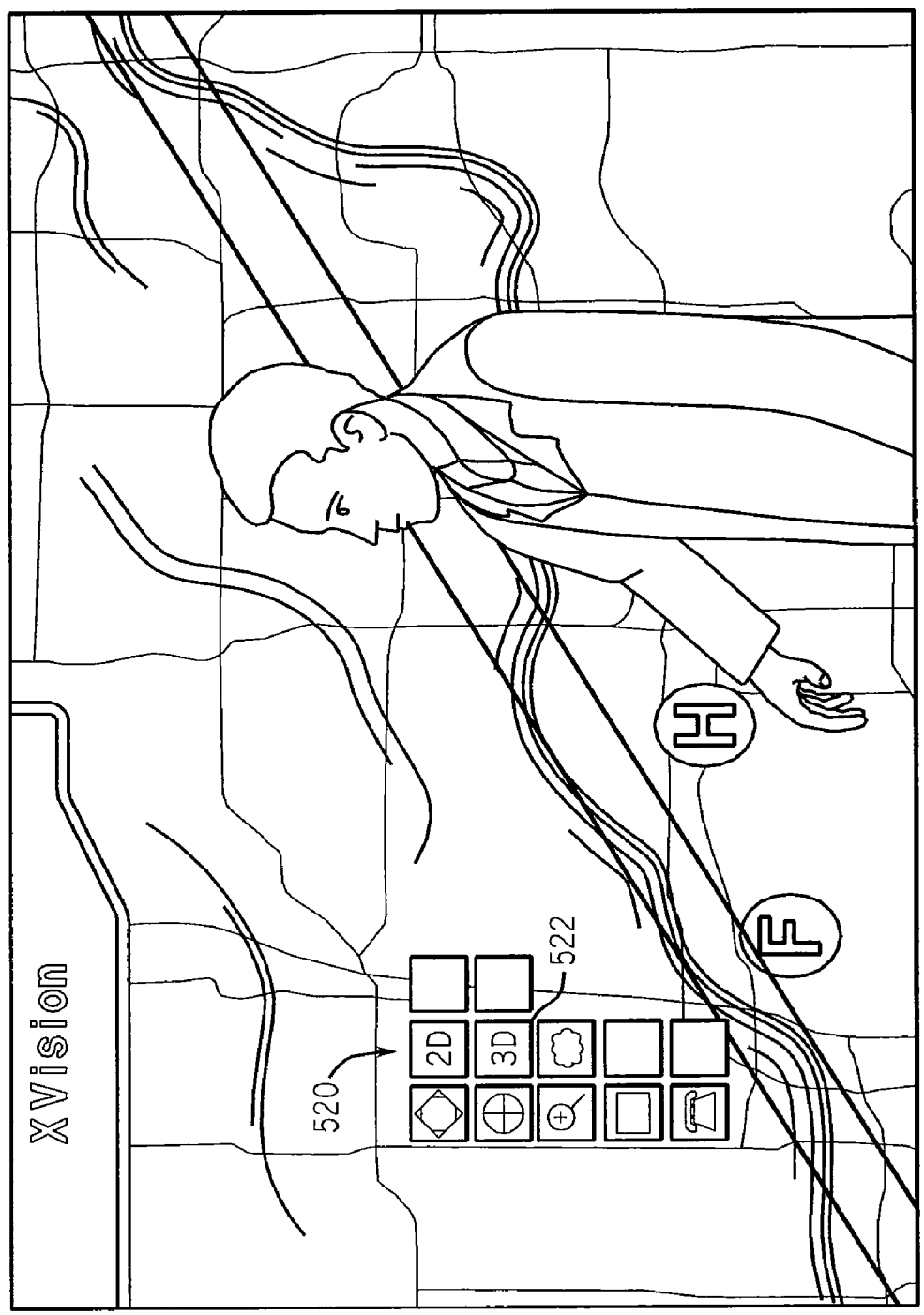

In a step 404, referring to FIG. 7B, apparatus 10 is configured to automatically zoom the two-dimensional representation to focus on the planar line 510 defined by the operator. The planar view may be defined as a vertical 3D textured rectangle drawn along the planar line 510. This rectangle defines a "face" that is outlined to illustrate the extent of the volume data. Apparatus 10 is further configured to display a three-dimensional planar view control interface 520 including a plurality of controls to manipulate the presentation of the weather information. The planar view control interface 520 may be configured to include representation view controls 522 for switching between a two-dimensional view and a three-dimensional view.

Figure 7C:
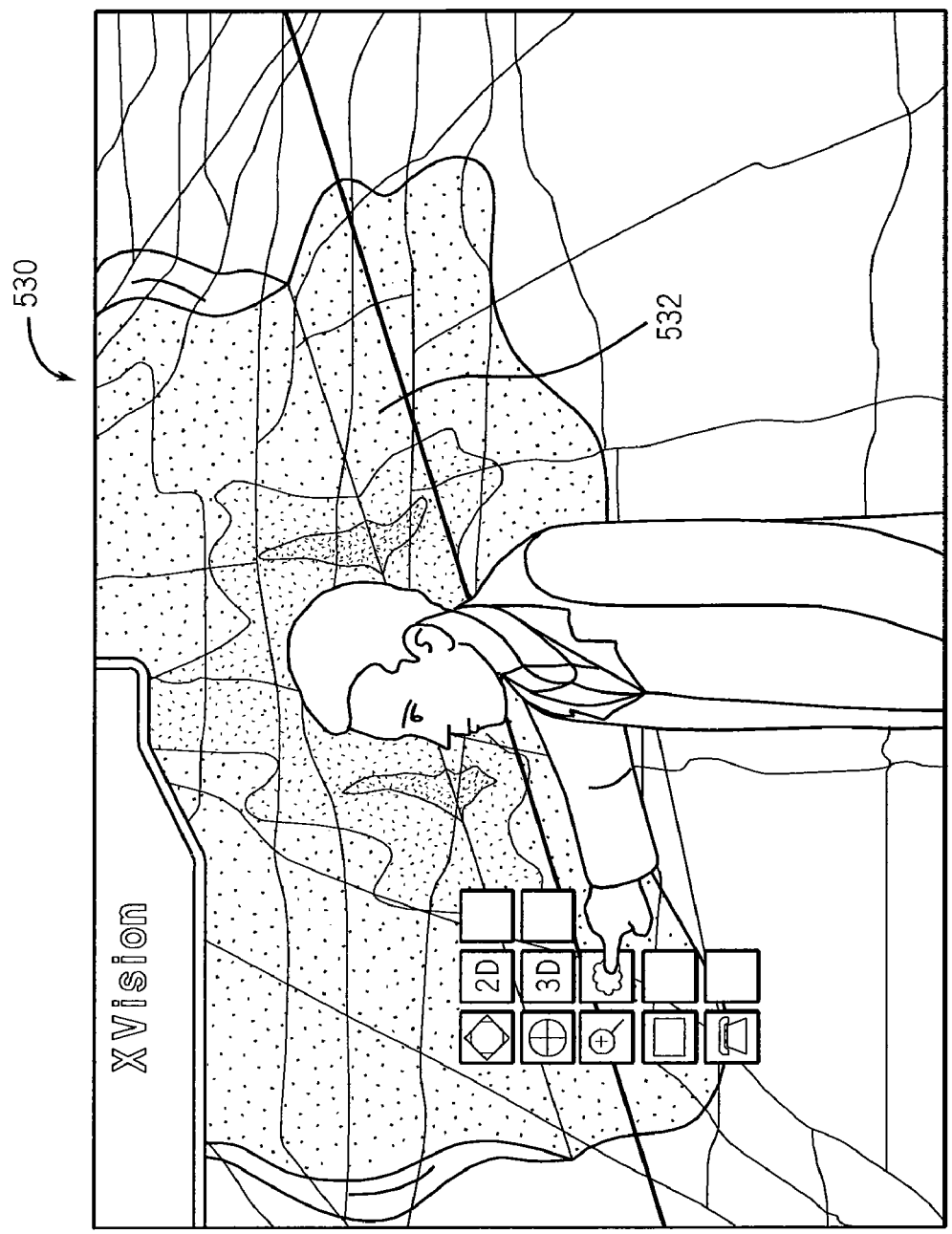

In a step 406, referring also to FIG. 7C, the operator may utilize control interface 522 to display an planar representation 530 of three-dimensional weather data including a planar representation face 532. An planar view is a view wherein the front face 532 is shown in detail and the volume is shown as a three-dimensional representation extending behind the face, but removed in front to reveal the internal structure of the volume. Accordingly, since the three-dimensional representation include a transparency component as described above, the weather information behind representation face 532 will be visible through representation face 532.

Figure 7D:
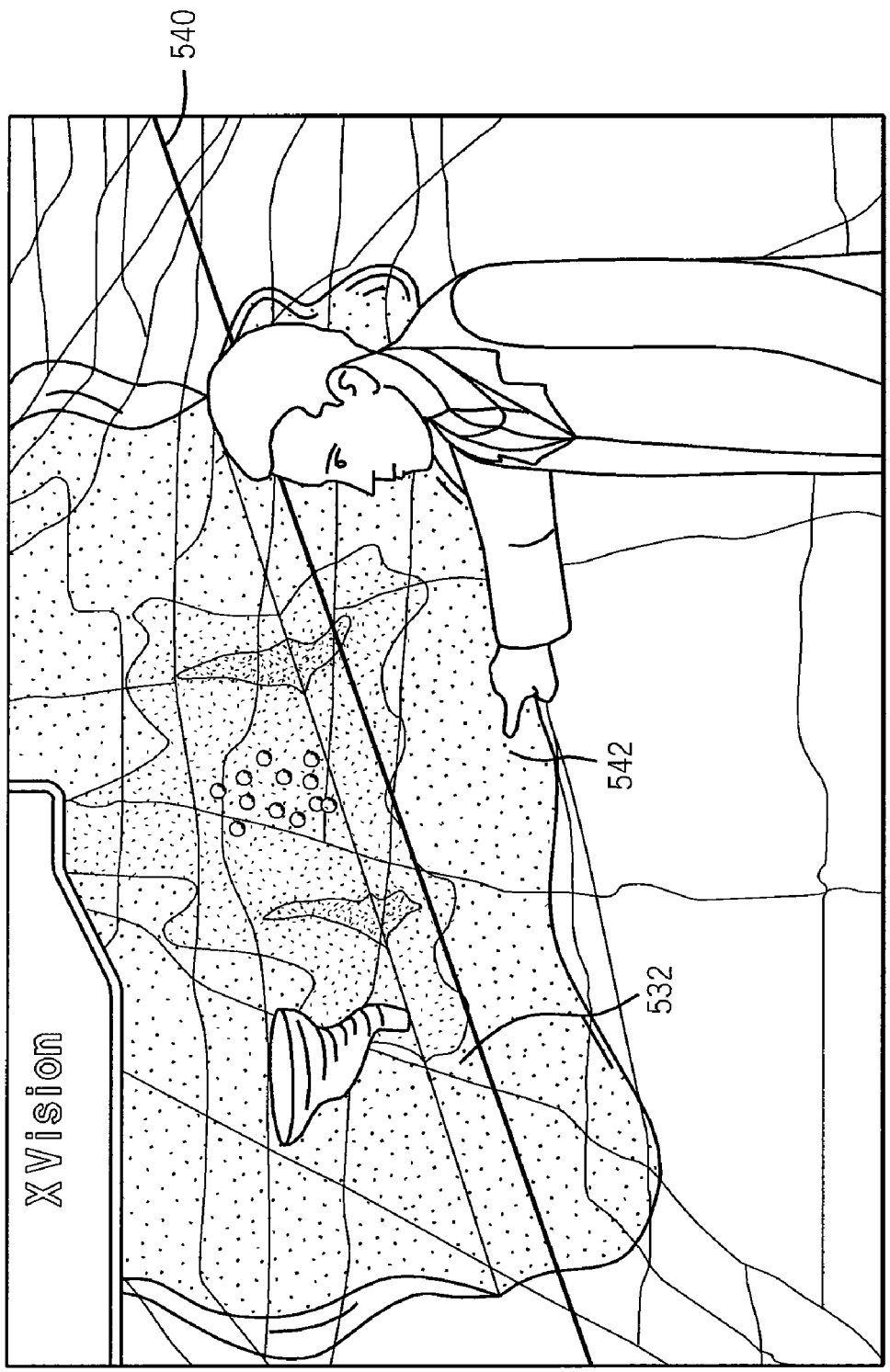

In a step 408, referring also to FIG. 7D, the operator may manipulate the representation face 532 may manipulate the first location 540 of the planar line 510 within the weather information data. For example, the operator may select the planar line 510 using an outstretched hand and communication device 338 as shown in FIG. 5D, or using a mouse in a computer implementation. Referring now to FIG. 5E, the location of planar line 510 may be moved from first location 540 to a second location 542 within the weather information volume. Movement of the planar line 510 allows apparatus 510 to move forward and backward through a plurality of planar views to allow the operator to illustrate changes within the weather information and/or to highlight areas of interest. Definition of the planar line 510 and/or the view point in step 410 permit the apparatus 510 to pre-calculate the plurality of planar views such that the operator can quickly move forward and backward through the plurality of views. The normal displacement of each planar view may be configurable by the operator based on a desired smoothness of transition between views.

This apparatus 10 may be configurable to allow the operator to highlight an internal structure of a storm by allow the operator to use one or more filter on the weather information data being displayed. For example, the operator may utilize interface controls 522 to utilize a dBZ filter. The filter alters the 3D texture to make low dBZ values completely transparent. The volume can be sliced, and then the slice moved to display the entire radar volume. By filtering out the lower dBZ values, the volume of the storm core is highlighted. Other exemplary controls may include base mode selection where the lowest level of the volume is drawn in a manner similar to traditional radar displays, a color table selection where the 3D texture colors may be modified, an opacity control, etc.

Figure 8:
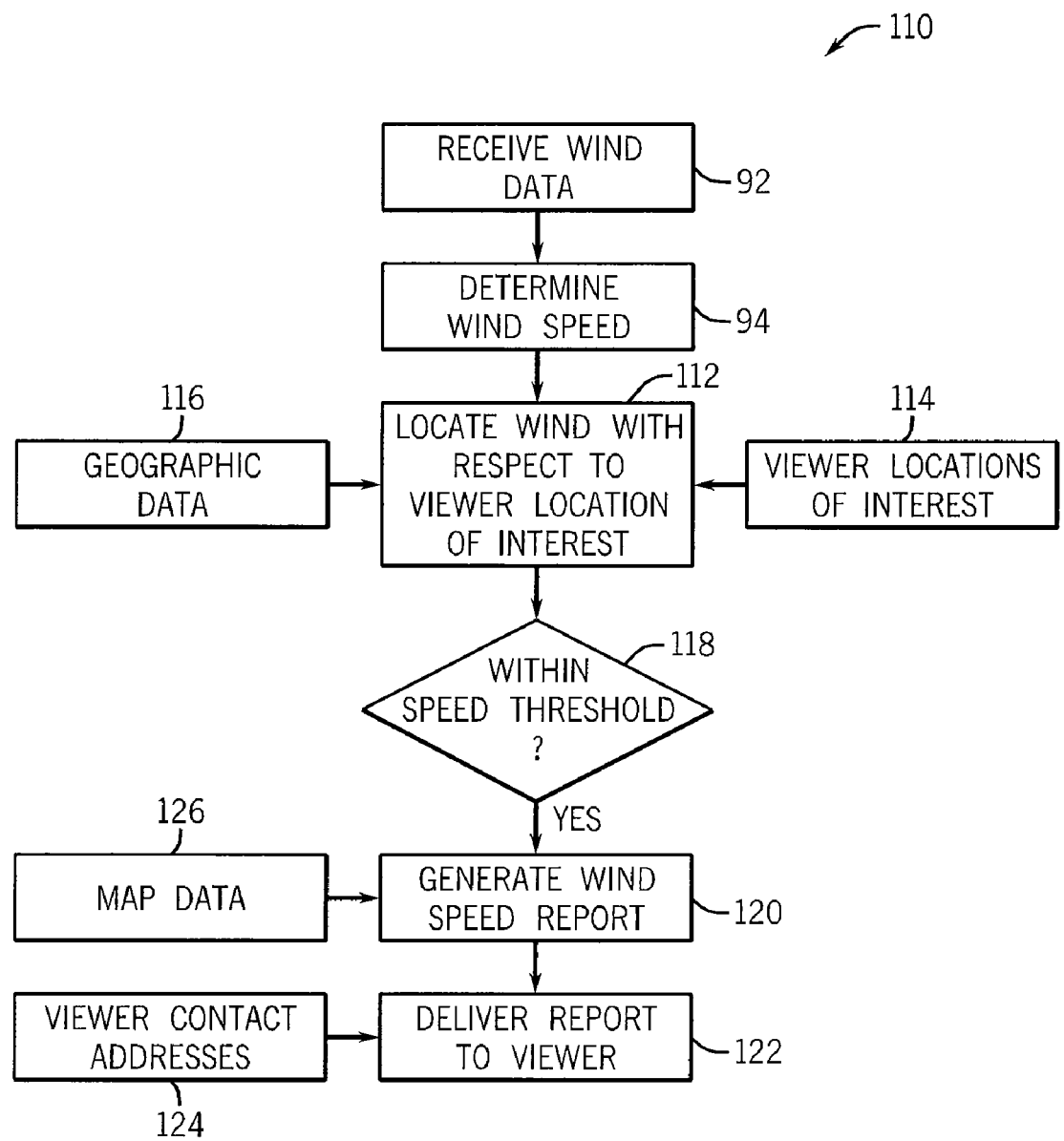
FIG. 8 is a flow chart diagram of an exemplary method for generating a personalized wind speed presentation in accordance with the present invention.

An alternative process 110 in accordance with the present invention for generating and providing personalized wind speed information to viewers now will be described with reference to FIG. 8. This process also begins with receiving 92 wind data from a wind speed information source 26. The absolute value wind speed is determined 94, as described above, if needed. The calculated wind speed is then compared 112 to a viewer's indicated location of interest.

It may then be determined 118 whether or not the determined wind speed for any particular viewer location of interest is above a threshold wind speed and thus is of likely interest to the viewer. This threshold wind speed may be fixed or may be viewer selectable by the viewer as part of the process of establishing the viewer profile. In the latter case this threshold wind speed may be saved as part of the viewer profile in the viewer profile database 44.

If the wind speed for a viewer location of interest is determined to exceed the wind speed threshold, a personalized wind speed presentation or warning may be generated 120 and delivered 122 to the viewer at the selected user contact address 124. The type of report generated 120 may depend upon the communications channel by which it is delivered. For example, and e-mail or cell phone text message warning may be of the form "Warning. Winds exceeding twenty miles per hour at your location." Such a message may be readily converted to a voice message using available voice generation programs and delivered via a cellular or land line telephone. Alternatively, or additionally, the personalized wind presentation may include a geographic display of the type illustrated above in FIG. 2, showing the wind speed contours on a map or other background with respect to the viewer location of interest. In this case, for example, the geographic display may be centered on the user location of interest, and/or the user location of interest clearly indicated. Such a graphic presentation may be generated using map 126 or other geographic data and delivered as part of an e-mail message or provided at a personalized web page that is accessible via a link provided in such an e-mail message.

It should be understood that the present invention is not limited to the particular exemplary applications and embodiments as illustrated and described herein, but embraces such modified forms thereof as come within the scope of the following claims.

What is claimed is:

1. A computer-implemented method of presenting wind speed information, comprising:
   (a) generating a three dimensional wind data volume based on received wind velocity data defining wind detected for a volume associated with a geographic area;
   (b) determining a location of a planar representation within the three dimensional wind data;
   (c) deriving from the wind data volume wind speed contour lines delineating regions within the location of the planar representation at which wind speeds within a selected range of wind speeds have been detected; and
   (c) displaying the wind speed contour lines in a planar representation overlaid on a graphical representation of the geographic area to provide a wind speed information presentation.

2. The computer-implemented method of claim 1, wherein the wind data includes wind velocity data relative to a radar site and wherein deriving the wind speed contour lines includes converting the wind velocity data relative to the radar site to absolute wind speed information and deriving the wind speed contour lines from the absolute wind speed information.

3. The computer-implemented method of claim 2, wherein receiving wind velocity data relative to a radar site includes receiving wind velocity data from a NEXRAD weather radar source.

4. The computer-implemented method of claim 1, wherein the NEXRAD weather radar source is a dual-pole radar system.

5. The computer-implemented method of claim 1, further including displaying an indication of the wind speeds delineated by the wind speed contour lines by displaying the wind speed contour lines in colors indicating the wind velocities delineated thereby.

6. The computer-implemented method of claim 1, comprising additionally:
   (a) receiving weather radar reflectivity data indicating precipitation detected for the geographic area;
   (b) deriving a graphical representation of the received weather radar reflectivity data;
   (c) displaying the graphical representation of the reflectivity data overlaid on the graphical representation of the geographic area; and
   (d) wherein displaying the wind speed contour lines includes displaying the wind speed contour lines overlaid on the graphical representation of the reflectivity data and the graphical representation of the geographic area.

7. The computer-implemented method of claim 1, wherein the graphical representation of the geographic area is a computer generated map display.

8. The computer-implemented method of claim 1, comprising additionally broadcasting the wind speed information presentation as part of a televised weather report presentation.

9. A computer-implemented system for generating a wind speed information presentation, comprising:
   (a) a geography database including graphical representations of geographic areas;
   (b) a graphical display device; and
   (c) a computer system connected to the geography database to retrieve graphical representations of geographic areas therefrom, to the graphical display device, and to a source of wind data and adapted to generate a three dimensional wind data volume based on received wind velocity data detected for a geographic area from the source of wind data, to receive a location of a planar representation within the three dimensional wind data, to derive from the wind data volume wind speed contour lines delineating regions within the location of the planar representation at which wind speeds within a selected range of wind speeds have been detected; and to display on the graphical display device, in a planar representation, the wind speed contour lines overlaid on a graphical representation of the geographic area to provide a wind speed information presentation.

10. The computer implemented system of claim 9, wherein the wind speed data received from the source of wind data includes wind velocity data relative to a radar site and wherein the computer system is adapted to convert the wind velocity data relative to the radar site to absolute wind speed information and to derive the wind speed contour lines from the absolute wind velocity information.

11. The computer implemented system of claim 10, wherein the computer system is connected to a NEXRAD weather radar source to receive wind velocity data relative to a NEXRAD radar site therefrom.

12. The computer implemented system of claim 9, wherein the computer system is adapted to display on the graphical display device an indication of the wind speeds delineated by the wind velocity contour lines.

13. The computer implemented system of claim 12, wherein the computer system is adapted to display on the graphical display device an indication of the wind speeds delineated by the wind speed contour lines by displaying the wind speed contour lines in colors indicating the wind speeds delineated thereby.

14. The computer implemented system of claim 9, wherein the computer system is connected to a weather radar system and is further adapted to receive from the weather radar system weather radar reflectivity data indicating precipitation detected for the geographic area, to derive a graphical representation of the received weather radar reflectivity data, and to display on the graphical display the graphical representation of the reflectivity data overlaid on the graphical display of the geographic area with the wind speed contour lines displayed overlaid on the graphical representation of the reflectivity data and the graphical display of the geographic area.

15. The computer implemented system of claim 9, wherein the geography database includes computer generated maps of geographic areas and wherein the graphical representation of the geographic area displayed on the graphical display device is a computer generated map display.

16. The computer implemented system of claim 9, wherein the graphical display device is a computer monitor device.

17. The computer implemented system of claim 9, wherein the computer system is connected to a broadcast system and is adapted to send the wind speed information presentation to the broadcast system for broadcasting the wind speed information presentation as part of a televised weather report presentation.

18. A computer-implemented method of presenting three-dimensional weather information, comprising:
   (a) generating a three dimensional weather data volume based on received weather data detected for a volume associated with a geographic area;
   (b) determining a location of a planar representation within the three dimensional weather data;
   (c) deriving from the weather data volume, contour lines delineating regions within the location of the planar representation at which weather data within a selected range of weather data has been detected; and
   (d) displaying the contour lines in a planar representation overlaid on a graphical representation of the geographic area to provide a weather data information presentation.

19. The computer-implemented method of claim 18, wherein the NEXRAD weather radar source is a dual-pole radar system.

20. The computer-implemented method of claim 19, wherein the planar representation is configured to include multiple types of weather data.

* * * * *